US012770585B2

(12) United States Patent
Yan et al.

(10) Patent No.: US 12,770,585 B2
(45) Date of Patent: Oct. 20, 2026

(54) DISPLAY PANEL AND DISPLAY APPARATUS SOLVING SUB-PIXEL BORROWING PROBLEM

(71) Applicant: Shanghai Tianma Micro-Electronics Co., Ltd., Shanghai (CN)

(72) Inventors: Ye Yan, Shanghai (CN); Xiaodong Yang, Shanghai (CN); Dandan Chu, Shanghai (CN); Jiandong Wang, Shanghai (CN); Xiongping Li, Shanghai (CN)

(73) Assignee: Shanghai Tianma Microelectronics Co., Ltd., Shanghai (CN)

( * ) Notice: Subject to any disclaimer, the term of this patent is extended or adjusted under 35 U.S.C. 154(b) by 0 days.

(21) Appl. No.: 18/806,364

(22) Filed: Aug. 15, 2024

(65) Prior Publication Data

US 2024/0404484 A1 Dec. 5, 2024

(30) Foreign Application Priority Data

Oct. 11, 2023 (CN) ........................ 202311316489.9

(51) Int. Cl.
*G09G 3/36* (2006.01)

(52) U.S. Cl.
CPC ......... *G09G 3/3607* (2013.01); *G09G 3/3648* (2013.01); *G09G 2300/0452* (2013.01);
(Continued)

(58) Field of Classification Search
CPC ...... G09G 3/36; G09G 3/3607; G09G 3/3611; G09G 3/3614; G09G 3/3622;
(Continued)

(56) References Cited

U.S. PATENT DOCUMENTS 11,152,432 B1 10/2021 Liu et al.
2005/0134541 A1 * 6/2005 Jang .................... G09G 3/3688 345/94
(Continued)

FOREIGN PATENT DOCUMENTS

CN 104678670 A 6/2015
CN 107004392 A 8/2017
(Continued)

OTHER PUBLICATIONS

Office Action mailed Jul. 26, 2025, issued in corresponding Chinese Application No. 202311316489.9, filed Oct. 11, 2023, 24 pages.

*Primary Examiner* — Ke Xiao
*Assistant Examiner* — Nelson Lam
(74) *Attorney, Agent, or Firm* — CHRISTENSEN O'CONNOR JOHNSON KINDNESS PLLC

(57) ABSTRACT

A display panel and a display apparatus, in the display panel, a pixel unit includes a plurality of sub-pixels, the sub-pixels in a same pixel unit are electrically connected to a same scan line and are each electrically connected to different data lines/the display panel further includes demultiplexers, each demultiplexer includes two output terminals connected to different data lines, and is configured to transmit data signals to different data lines. The plurality of sub-pixels of the same pixel unit include at least three sub-pixels with different colors. Accordingly, the pixel units need not to borrow sub-pixels from each other while achieving full-color display of the display panel, which is conducive to improving the stability of display quality, using 1:2 demultiplexers to transmit data signals to sub-pixels ensures that each sub-pixel has sufficient charging time, thereby being conducive to ensuring the display quality of the display panel.

16 Claims, 14 Drawing Sheets

(52) U.S. Cl.
CPC . *G09G 2310/0297* (2013.01); *G09G 2310/08* (2013.01); *G09G 2320/0242* (2013.01)

(58) Field of Classification Search
CPC .... G09G 3/3625; G09G 3/364; G09G 3/3644; G09G 3/3648; G09G 3/3655; G09G 3/3659; G09G 3/3666; G09G 3/3674; G09G 3/3677; G09G 3/3681; G09G 3/3685; G09G 3/3688; G09G 3/3692; G09G 3/3696; G09G 2300/0452
USPC .................................................... 345/87–104
See application file for complete search history.

(56) References Cited

U.S. PATENT DOCUMENTS

| | | | | |
|---|---|---|---|---|
| 2008/0129906 | A1* | 6/2008 | Lin | G09G 3/3648 349/33 |
| 2008/0224982 | A1* | 9/2008 | Yamazaki | G09G 3/3688 345/98 |
| 2009/0251455 | A1* | 10/2009 | Park | G09G 3/2007 345/84 |
| 2009/0289878 | A1* | 11/2009 | Chen | G09G 3/3688 345/87 |
| 2010/0013864 | A1* | 1/2010 | Oelhafen | G09G 3/3688 345/690 |
| 2010/0091046 | A1* | 4/2010 | Matsuura | G09G 3/3677 345/87 |
| 2010/0156776 | A1* | 6/2010 | Jeoung | G09G 3/3688 345/98 |
| 2013/0222216 | A1* | 8/2013 | Park | G09G 3/3688 345/55 |
| 2013/0222219 | A1* | 8/2013 | Saitoh | G09G 3/3696 327/437 |
| 2014/0232626 | A1* | 8/2014 | Jamshidi-Roudbari | G09G 3/3688 345/99 |
| 2015/0287378 | A1* | 10/2015 | Jeong | G09G 3/3688 345/694 |
| 2022/0197438 | A1 | 6/2022 | Sun et al. | |
| 2023/0018362 | A1* | 1/2023 | Park | G09G 3/3241 |

FOREIGN PATENT DOCUMENTS

| | | | |
|---|---|---|---|
| CN | 207068854 | U | 3/2018 |
| CN | 107909979 | A | 4/2018 |
| CN | 108172607 | A | 6/2018 |
| CN | 108615504 | A | 10/2018 |
| CN | 111951727 | A | 11/2020 |

* cited by examiner

DISPLAY PANEL AND DISPLAY APPARATUS SOLVING SUB-PIXEL BORROWING PROBLEM

CROSS-REFERENCE TO RELATED APPLICATION

The present application claims priority to Chinese Patent Application No. 202311316489.9, filed on Oct. 11, 2023, the content of which is incorporated herein by reference in its entirety.

TECHNICAL FIELD

The present application relates to the field of display technology, and in particular, to a display panel and a display apparatus.

BACKGROUND

Liquid crystal displays (LCD) have the advantages of power saving, no radiation, soft picture and no eye injury, etc., and have a wide range of applications in the market.

In existing LCD products, sub-pixel rendering (SPR) technology is usually employed when a pixel density is required to be high, but this may have the problem of sub-pixel borrowing, which affects the stability of display quality.

SUMMARY

In view of this, embodiments of the present application provide a display panel and a display apparatus, to solve the above problem.

In a first aspect, an embodiment of the present application provides a display panel comprising a plurality of pixel units, a plurality of scan lines, and a plurality of data lines, wherein the pixel units each comprise a plurality of sub-pixels, the sub-pixels in a same pixel unit are electrically connected to a same scan line, and the sub-pixels in the same pixel unit are each electrically connected to different data lines; and wherein the display panel further comprises demultiplexers, each demultiplexer comprises two output terminals electrically connected to different data lines, and is configured to transmit data signals to the different data lines; wherein the sub-pixels of the same pixel unit comprise at least three sub-pixels with different colors.

In a second aspect, an embodiment of the present application provides a display apparatus comprising the display panel as provided in the first aspect.

In these embodiments, by setting the same pixel unit to comprise at least three sub-pixels with different colors, the pixel units P needs not to borrow sub-pixels from each other while achieving full-color display of the display panel, which is conducive to reducing the difficulty of driving the display panel, thereby being conducive to reduce the chances of problems in driving the pixel units to operate, and in turn being conducive to improving the stability of display quality.

Furthermore, by providing 1:2 demultiplexers to transmit data signals to sub-pixels, it is possible to not only reduce the number of ports through which a driving chip provides the data signals to the display panel to a certain extent, but also ensure that each sub-pixel has sufficient charging time, which is especially conducive to ensuring that each sub-pixel 10 has sufficient charging time during high frequency display of the display panel with high pixel density, thereby being conducive to ensuring that each sub-pixel receives a data signal that meets the requirements, and in turn being conducive to ensuring the display quality of the display panel.

BRIEF DESCRIPTION OF DRAWINGS

To describe the technical solutions in the embodiments of the present application more clearly, the following briefly describes the accompanying drawings required to be used in the embodiments. Apparently, the accompanying drawings in the following description show merely some embodiments of the present application, and a person of ordinary skill in the art may still derive other accompanying drawings from these accompanying drawings without creative efforts.

DESCRIPTION OF EMBODIMENTS

For a better understanding of the technical solutions of the present application, the following describes in detail the embodiments of the present application in conjunction with the accompanying drawings.

It should be noted that the described embodiments are merely some but not all of the embodiments of the present application. Based on the embodiments of the present application, all other embodiments obtained by a person of ordinary skill in the art without creative efforts fall within the protection scope of the present application.

Terms in the embodiments of the present application are merely used to describe the specific embodiments and are not intended to limit the present application. Unless otherwise specified in the context, words, such as "a", "the", and "this", in a singular form in the embodiments and appended claims of the present application comprise plural forms.

It should be understood that the term "and/or" herein merely describes associations between associated objects, and it indicates three types of relationships, for example, A and/or B may indicate that A exists alone, A and B coexist, or B exists alone. In addition, the character "/" in herein generally indicates that the associated objects are in an "or" relationship.

In the description of the present specification, it should be understood that the terms such as "substantially", "approximate to", "approximately", "about", "roughly", and "in general" described in the claims and embodiments of the present application mean general agreement within a reasonable process operation range or tolerance range, rather than an exact value.

It should be understood that although the terms such as first and second may be used to describe directions, pixel units, scan lines, and the like in the embodiments of the present application, these directions, pixel units, scan lines, and the like should not be limited to these terms. These terms are used only to distinguish between the directions, pixel units, scan lines, and the like from each other. For example, without departing from the scope of the embodiments of the present application, a first direction may also be referred to as a second direction, and similarly, a second direction may also be referred to as a first direction.

The applicant of the present application provides a solution to the problem existing in the prior art through careful and in-depth research.

Figure 1:
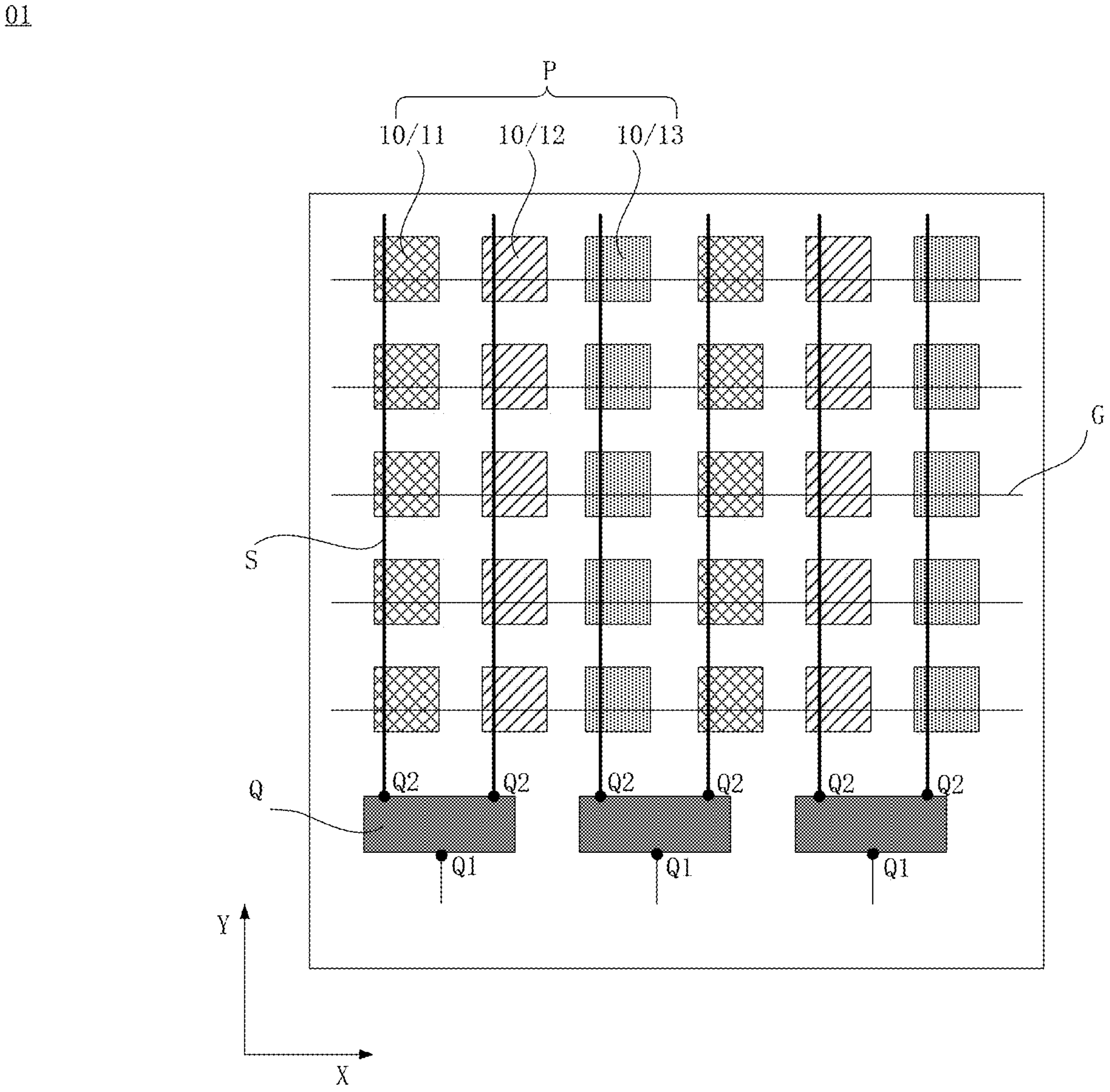
FIG. 1 is a schematic diagram of a display panel provided by an embodiment of the present application.
Figure 2:
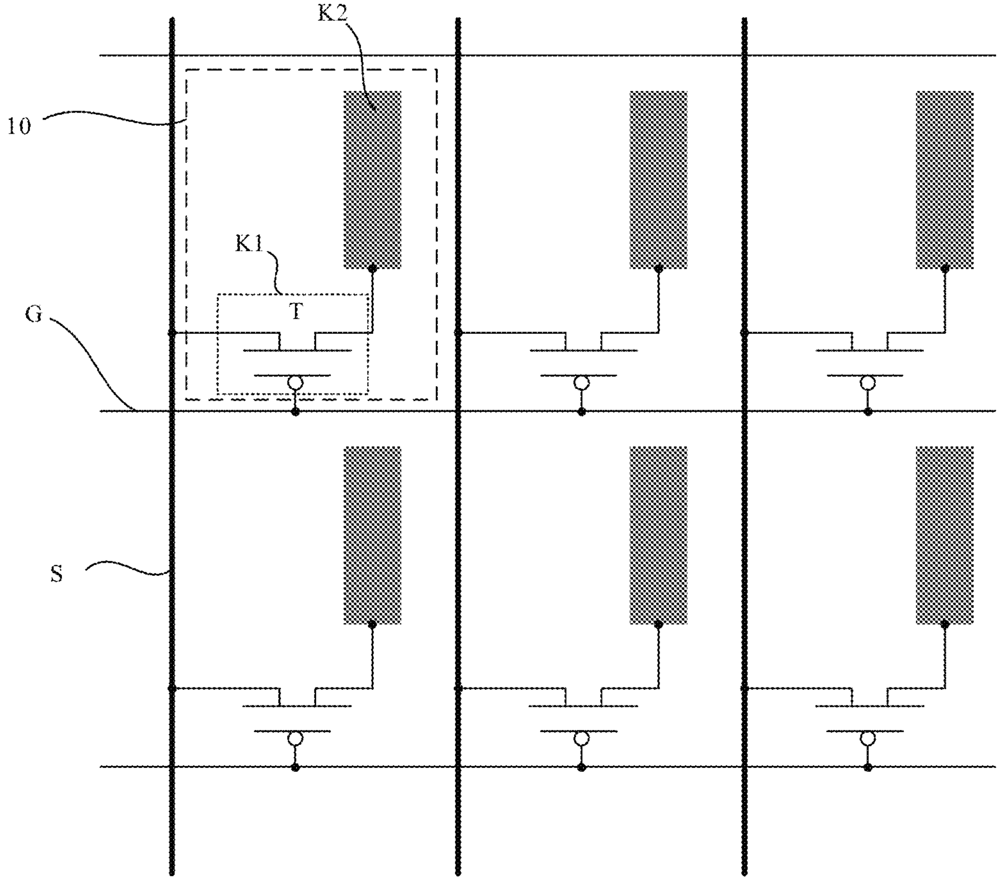
FIG. 2 is a schematic diagram of a connection in a sub-pixel related to the present application.
Figure 3:
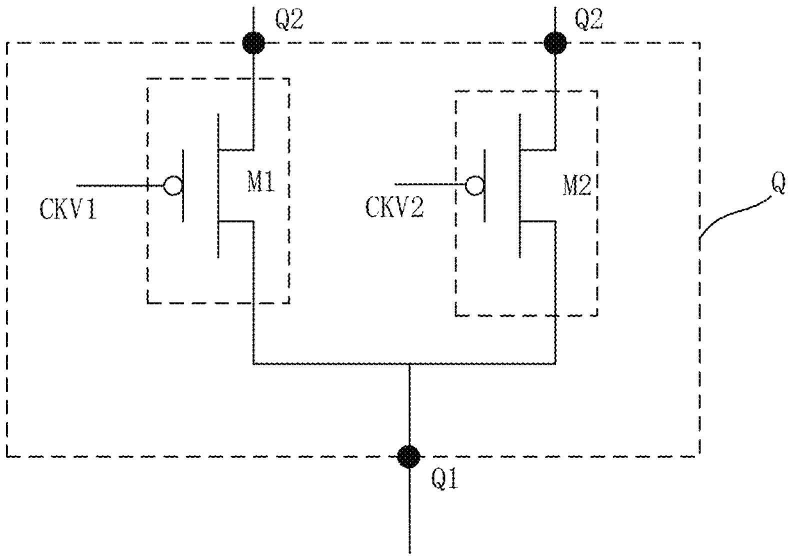
FIG. 3 is a schematic diagram of a demultiplexer provided by an embodiment of the present application.
Figure 4:
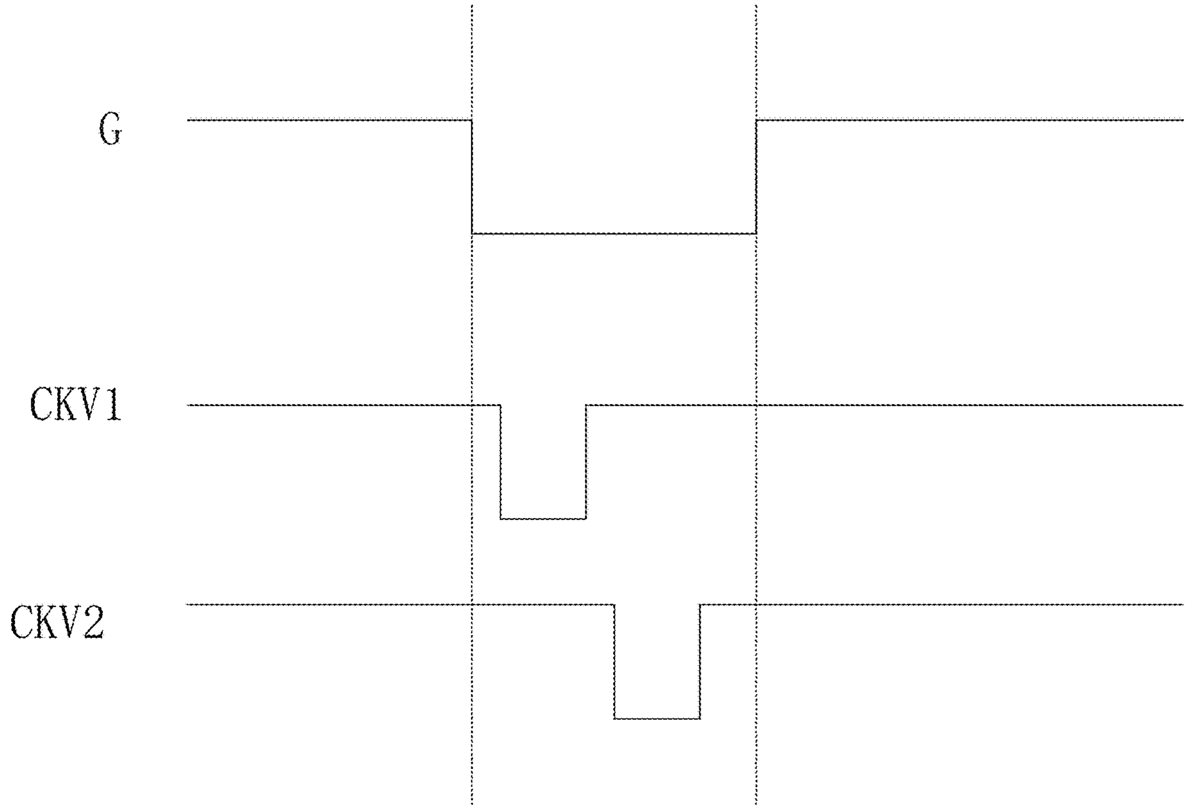
FIG. 4 is a driving timing diagram of a display panel provided by an embodiment of the present application.

FIG. 1 is a schematic diagram of a display panel provided by an embodiment of the present application, FIG. 2 is a schematic diagram of a connection in a sub-pixel related to the present application, FIG. 3 is a schematic diagram of a demultiplexer provided by an embodiment of the present application, and FIG. 4 is a driving timing diagram of a display panel provided by an embodiment of the present application.

An embodiment of the present application provides a display panel 01. As shown in FIG. 1, the display panel 01 comprises a plurality of pixel units P, a plurality of scan lines G, and a plurality of data lines S, the pixel units P comprises a plurality of sub-pixels 10, the sub-pixels 10 in a same pixel unit P are electrically connected to a same scan line G, and the sub-pixels 10 in the same pixel unit P are each electrically connected to different data lines S. The scan lines G and the data lines S are provided in different layers.

Specifically, as shown in conjunction with FIG. 1 and FIG. 2, the sub-pixel 10 comprises a switch module K1 and a pixel electrode K2, and the switch module K1 has an input terminal electrically connected to the data line S, an output terminal electrically connected to the pixel electrode K2, and a control terminal electrically connected to the scan line G.

Further, the switch module K1 comprises a transistor T, which has a first electrode electrically connected to the data line S, a second electrode electrically connected to the pixel electrode K2, and a gate electrically connected to the scan line G. When the scan line G transmits a valid signal to control the transistor T to turn on, a data signal transmitted by the data line S can be transmitted to the pixel electrode K2 of the sub-pixel 10 through the turned-on transistor T.

With continued reference to FIG. 1, the display panel 01 further comprises demultiplexers Q, the demultiplexer Q comprises an input terminal Q1 and two output terminals Q2, the two output terminals Q2 are electrically connected to different data lines S, and the demultiplexer Q is configured to transmit data signals to different data lines S.

Optionally, two output terminals Q2 of a same demultiplexer Q are electrically connected to two adjacent data lines S, respectively, and the two output terminals Q2 are configured to transmit the data signal received at the input terminal Q1 to the data lines S connected thereto in a time division manner.

As shown in conjunction with in FIG. 3 and FIG. 4, the demultiplexer Q comprises a first transistor M1 and a second transistor M2, and the first transistor M1 has a first electrode electrically connected to the input terminal Q1 of the demultiplexer Q, a second electrode electrically connected to one output terminal Q2 of the demultiplexer Q, and a gate is electrically connected to a first control line CKV1. The second transistor M2 has a first electrode electrically connected to the input terminal Q1 of the demultiplexer Q, a second electrode electrically connected to the other output terminal Q2 of the demultiplexer Q, and a gate electrically connected to a second control line CKV2.

In a frame of the display panel 01, the first control line CKV1 and the second control line CKV2 transmit valid signals (such as low-level signals) in sequence to control the first transistor M1 and the second transistor M2 to turn on in the time division manner, and the demultiplexer Q transmits the data signal received at the input terminal Q1 to different data lines S in the time division manner.

It should be noted that a plurality of demultiplexers Q can be comprised in the display panel 01, and the gates of the first transistors M1 in different demultiplexers Q can be connected to a same first control line CKV1, the first control line CKV1 can transmit a valid signal to control the first transistors M1 in the plurality of demultiplexers Q connected thereto to turn on simultaneously. The gates of the second transistors M2 in different demultiplexers Q can be connected to a same second control line CKV2, and the second control line CKV2 can transmit a valid signal to control the second transistors M2 in the plurality of demultiplexers Q connected thereto to turn on simultaneously.

Wherein the plurality of sub-pixels 10 of the same pixel unit P comprise at least three sub-pixels 10 with different colors.

Optionally, the same pixel unit P may comprise a red sub-pixel, a green sub-pixel, and a blue sub-pixel.

In addition, a same sub-pixel 10 belongs to only one pixel unit P, and the pixel units P does not have the problem of borrowing sub-pixels 10 from each other.

In the embodiment of the present application, the same pixel unit P is set to comprise at least three sub-pixels 10 with different colors, such that while full-color display of the display panel 01 can be achieved, the pixel units P need not to borrow sub-pixels 10 from each other, which is conducive to reducing the difficulty of driving the display panel 01, thereby being conducive to reducing the chances of problems in driving the pixel units P to operate, and in turn being conducive to improving the stability of display quality.

Furthermore, 1:2 demultiplexers Q are provided to transmit data signals to sub-pixels 10, which can not only reduce the number of ports through which a driving chip provides the data signals to the display panel 01 to a certain extent, but also ensure that each sub-pixel 10 has sufficient charging time, which is especially conducive to ensuring that each sub-pixel 10 has sufficient charging time during high frequency display of the display panel 01 with high pixel density, thereby being conducive to ensuring that each sub-pixel 10 receives a data signal that meets the requirements, and in turn being conducive to ensuring the overall display quality of the display panel 01.

With continued reference to FIG. 1, in one embodiment of the present application, the sub-pixels 10 are square in shape. That is, the sub-pixels 10 have a same length in a row direction and a column direction of the display panel 01.

In the prior art, the sub-pixels in a display panel are typically in stripe arrangements, and the dimensions of the sub-pixels in a length direction is much larger than those in a width direction.

Through research, the inventors of the present application have found that for stripe-shaped sub-pixels, their dimensions in the width direction impose even more limitations in process capability on the preparation of the sub-pixels than their dimensions in the length direction. When stripe-shaped sub-pixels with smaller dimensions are implemented, their dimensions in the width direction are firstly constrained by a process equipment and the process capability and cannot be further reduced. At this point, their dimensions in the length direction have not yet reached the limit of the process capability, and there is still room for reduction.

Therefore, in one embodiment of the present application, the sub-pixels 10 are set to be square, and under the constraints of the same process conditions, their dimensions in both the row direction and the column direction can reach the limitations in process capability, which can achieve a smaller area compared to the stripe-shaped sub-pixels, thereby being conducive to increasing the number of sub-pixels 10 per unit area in the display panel 01, and in turn be conducive to making the display panel 01 have a higher pixel density.

In one embodiment of the present application, with continued reference to FIG. 1, the plurality of data lines S are arranged along a first direction X, the data lines S extend along a second direction Y, and the first direction X intersects with the second direction Y.

Optionally, the first direction X is the row direction of the display panel 01, and the second direction Y is the column direction of the display panel 01.

The at least three sub-pixels 10 with different colors of the pixel unit P comprise a first-color sub-pixel 11, a second-color sub-pixel 12, and a third-color sub-pixel 13. In the same pixel unit P, the data lines S electrically connected to the first-color sub-pixel 11, the second-color sub-pixel 12, and the third-color sub-pixel 13, respectively, are adjacent in the first direction X.

In other words, the plurality of data lines S electrically connected to the same pixel unit P can be arranged adjacent to each other in the first direction X, and no other data lines S are provided between these data lines S.

Optionally, the first-color sub-pixel 11 is a red sub-pixel, the second-color sub-pixel 12 is a green sub-pixel, and the third-color sub-pixel 13 is a blue sub-pixel.

In the embodiment of the present application, the plurality of data lines S electrically connected to the sub-pixels 10 in the same pixel unit P are provided adjacent to each other, such that a maximum distance between these data lines S as a whole and the pixel unit P electrically connected thereto is relatively short, which is conducive to reducing the length of connecting lines between these data lines S and the pixel unit P, thereby being conducive to both saving materials and reducing the difficulty in the preparation of the display panel 01.

In one embodiment of the present application, as shown in FIG. 1, in the display panel 01, the pixel units P are arranged in an array along the first direction X and the second direction Y, and in the same pixel unit P, the first-color sub-pixel 11, the second-color sub-pixel 12, and the third-color sub-pixel 13 are arranged along the first direction X.

Wherein at least some of the pixel units P arranged along the first direction X are electrically connected to the same scan line G, that is, the scan line G can extend along the first direction X, at least some of the first-color sub-pixels 11, at least some of the second-color sub-pixels 12, and at least some of the third-color sub-pixels 13 arranged along the first direction X can be electrically connected to the same scan line G.

And at least some of the sub-pixels 10 arranged along the second direction Y are electrically connected to a same data line S.

Optionally, the sub-pixels 10 arranged along the second direction Y have a same color. In other words, in the pixel units P arranged along the second direction Y, the first-color sub-pixels 11 may be in a same column, the second-color sub-pixels 12 may be in a same column, and the third-color sub-pixels 13 may be in a same column.

In the embodiment of the present application, the scan lines G can extend along the first direction X, and the plurality of scan lines G can be arranged along the second direction Y. As shown in conjunction with FIG. 1 to FIG. 4, during a period in which the scan line G transmits a valid signal (such as a low level), the first transistor M1 and the second transistor M2 in the demultiplexer Q are turned on in sequence to control the two output terminals Q2 of the demultiplexer Q to transmit data signals to the data lines S electrically connected thereto in sequence. Since the first transistors M1 in the demultiplexers Q in the display panel 01 can be turned on simultaneously, and the second transistors M2 in the demultiplexers Q can also be turned on simultaneously, during the period in which the scan line G transmits the valid signal (such as the low level), the first-color sub-pixel 11, the second-color sub-pixel 12, and the third-color sub-pixel 13 in the same pixel unit P can all receive data signals, thereby achieving full-color display of the display panel 01.

Figure 5:
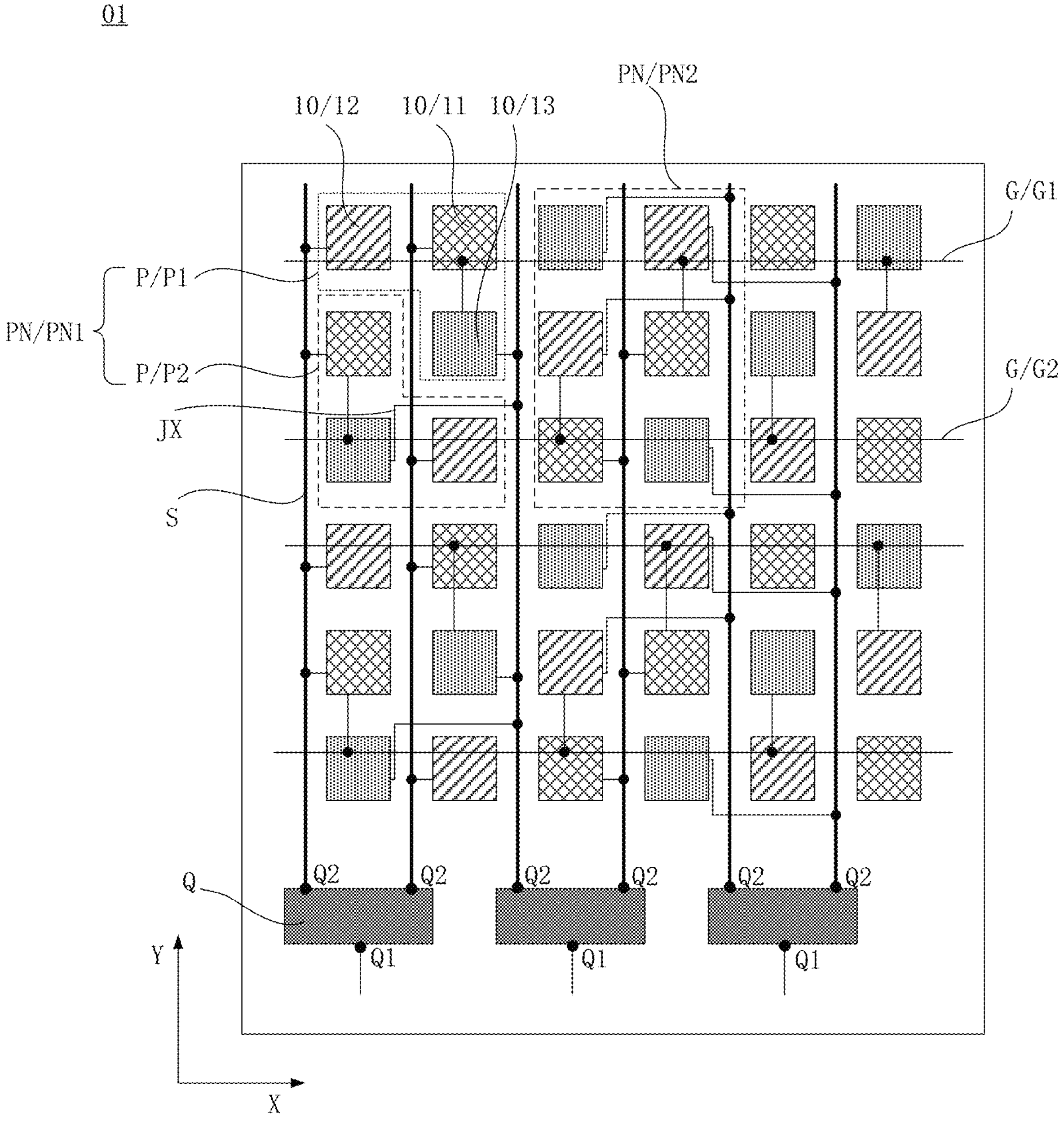
FIG. 5 is a schematic diagram of another display panel provided by an embodiment of the present application.

FIG. 5 is a schematic diagram of still another display panel provided by an embodiment of the present application.

In one embodiment of the present application, as shown in FIG. 5, in the display panel 01, two sub-pixels of the first-color sub-pixel 11, the second-color sub-pixel 12, and the third-color sub-pixel 13 in the same pixel unit P are arranged along the first direction X, and the other sub-pixel of the first-color sub-pixel 11, the second-color sub-pixel 12, and the third-color sub-pixel 13 is arranged along the second direction Y with one of the two sub-pixels.

For example, in the same pixel unit P, the first-color sub-pixel 11 and the second-color sub-pixel 12 are arranged along the first direction X, and the third-color sub-pixel 13 and the first-color sub-pixel 11 are arranged along the second direction Y.

In other words, the first-color sub-pixel 11, the second-color sub-pixel 12, and the third-color sub-pixel 13 in the same pixel unit P can be arranged in an "L" shape.

Two adjacent pixel units P along the second direction Y can form a pixel unit group PN, and in a same pixel unit group PN, the first-color sub-pixels 11, the second-color sub-pixels 12, and the third-color sub-pixels 13 form a rectangular arrangement.

Optionally, as shown in FIG. 5, the pixel unit group PN formed by two pixel units P comprises two first-color sub-pixels 11, two second-color sub-pixels 12, and two third-color sub-pixels 13, which sub-pixels are arranged in a rectangular pattern with three rows and two columns.

In the embodiment of the present application, a distance between the sub-pixels 10 in the same pixel unit P may be set to be shorter, which is conducive to improving a light mixing effect between the sub-pixels 10 and thus enhancing the display quality of the display panel 01. Meanwhile, the sub-pixels 10 in the pixel unit group PN are provided in a rectangular pattern, which can ensure a tight arrangement of the pixel units P, so as to enhance the finesse of a displayed picture, thereby being conducive to further ensuring the display effect.

Optionally, with continued reference to FIG. 5, in the same pixel unit group PN, the colors of the sub-pixels 10 arranged along the second direction Y are different from each other. In this way, it is conducive to resulting in a more uniform distribution of the sub-pixels with different colors in the pixel unit group PN, thereby being conducive to further improving the light mixing effect between the sub-pixels 10 and in turn enhancing the display quality of the display panel 01.

Optionally, with continued reference to FIG. 5, in two adjacent pixel unit groups PN along the first direction X, the sub-pixels 10 of one of the two adjacent pixel unit groups and the sub-pixels 10 of the other one of two adjacent pixel unit groups that are adjacent to each other along the first direction X are different in color.

For example, as shown in FIG. 5, a plurality of pixel unit groups PN comprise a first pixel unit group PN1 and a second pixel unit group PN2 adjacent to each other along the first direction X, the first-color sub-pixel 11 in the first pixel unit group PN1 is adjacent to the third-color sub-pixel 13 in the second pixel unit group PN2, the second-color sub-pixel 12 in the first pixel unit group PN1 is adjacent to the first-color sub-pixel 11 in the second pixel unit group PN2, and the third-color sub-pixel 13 in the first pixel unit group PN1 is adjacent to the second-color sub-pixel 12 in the second pixel unit group PN2.

Certainly, in two adjacent pixel unit groups PN along the second direction Y, the sub-pixels 10 of one of the two adjacent pixel unit groups and the sub-pixels of the other one of two adjacent pixel unit groups that are adjacent to each other along the first direction X may be different in color.

In this way, it is conducive to resulting in a more uniform distribution of the sub-pixels 10 with different colors within the display panel 01, thereby being conducive to further improving the display quality of the display panel 01.

In one embodiment of the present application, as shown in FIG. 5, the plurality of scan lines G are arranged along the second direction Y, and the plurality of scan lines G comprise a first scan line G1 and a second scan line G2 adjacent to each other along the second direction Y, and the first scan line G1 and the second scan line G2 are electrically connected to the same pixel unit group PN.

Two pixel units P in the same pixel unit group PN are a first pixel unit P1 and a second pixel unit P2, in at least some of the pixel unit groups PN arranged along the first direction X, the first pixel units P1 are electrically connected to the first scan line G1, and the second pixel units P2 are electrically connected to the second scan line G2.

In the embodiment of the present application, when the first scan line G1 transmits a valid signal to control the transistors T in the first pixel unit P1 to turn on and the output terminals Q2 of the demultiplexers Q transmit data signals to the data lines S electrically connected to the transistors T in the first pixel unit P1, the normal operation of the first pixel unit P1 is realized. When the second scan line G2 transmits a valid signal to control the transistors T in the second pixel unit P2 to turn on and the output terminals Q2 of the demultiplexers Q transmit data signals to the data lines S electrically connected to the transistors T in the second pixel unit P2, the normal operation of the second pixel unit P2 is realized. Of course, the data lines S connected to the first pixel unit P1 and the second pixel unit P2 can be the same.

Figure 6:
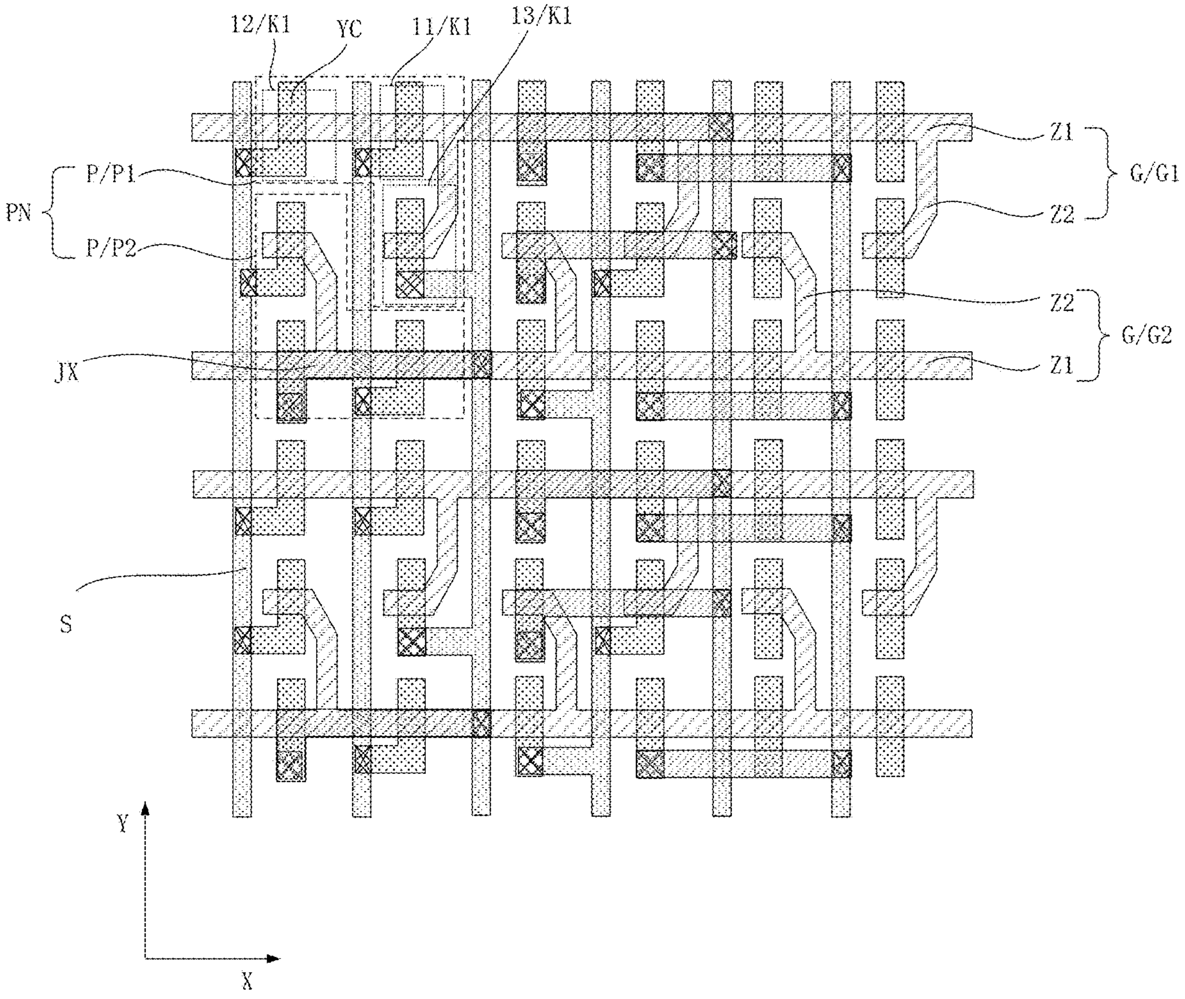
FIG. 6 is a schematic diagram of a planar layout of the display panel shown in FIG. 5.

FIG. 6 is a schematic diagram of a planar layout of the display panel shown in FIG. 5.

In conjunction with FIG. 5 and FIG. 6, in one embodiment of the present application, the scan line G comprises a main portion Z1 extending along the first direction X and a plurality of branches Z2 connected to the main portion Z1. The sub-pixel 10 comprises a switch module K1, which comprises an active layer YC, which can be an active layer of the transistor T comprised in the switch module K1 in the embodiment described above.

Wherein in at least some of the sub-pixels 10 arranged along the first direction X, the active layers YC overlap with the main portion Z1 of the same scan line G along a thickness direction of the display panel 01. Moreover, in the first-color sub-pixel 11, the second-color sub-pixel 12, and the third-color sub-pixel 13 of the same pixel unit P, the active layer YC in the sub-pixel 10 which is not arranged along the first direction X with the other two the sub-pixels overlaps with the branch Z2 of the scan line G1 along the thickness direction of the display panel 01.

For example, as shown in FIG. 6, in the first pixel unit P1, the first-color sub-pixel 11 and the second-color sub-pixel 12 are arranged along the first direction X, and the active layers YC of the switch modules K1 in both the first-color sub-pixel 11 and the second-color sub-pixel 12 overlap with the main portion Z1 of the scan line G along the thickness direction of the display panel 01; and the third-color sub-pixel 13 and the first-color sub-pixel 11 are arranged along the second direction Y, and the active layer YC of the switch module K1 in the third-color sub-pixel 13 overlaps with the branch Z2 of the scan line G along the thickness direction of the display panel 01.

In other words, the sub-pixels 10 arranged along the first direction X can be provided with a scan signal by the main portion Z1 of the scan line G. In the same pixel unit P, the sub-pixel 10 which is not arranged along the first direction X with the other sub-pixels can be provided with the scan signal by the branch Z2 of the scan line G.

In the embodiment of the present application, while achieving the function of transmitting the scan signal from the scan line G to the sub-pixels 10, the structure of the scan line G is relatively simple, which is conducive to reducing the difficulty and cost of the preparation of the scan line G.

Optionally, as shown in FIG. 6, the branches Z2 of the first scan line G1 are located on a side of the main portion Z1 that faces the second scan line G2, and the branches Z2 of the second scan line G2 are located on a side of the main portion Z1 that faces the first scan line G1. Along the first direction X, the branches Z2 of the first scan line G1 and the branches of the second scan line G2 are alternately arranged. In this way, it is conducive to reducing the space occupied by the first scan line G1 and the second scan line G2 as a whole along the second direction Y, thereby being conducive to making the display panel 01 have a higher pixel density.

Figure 7:
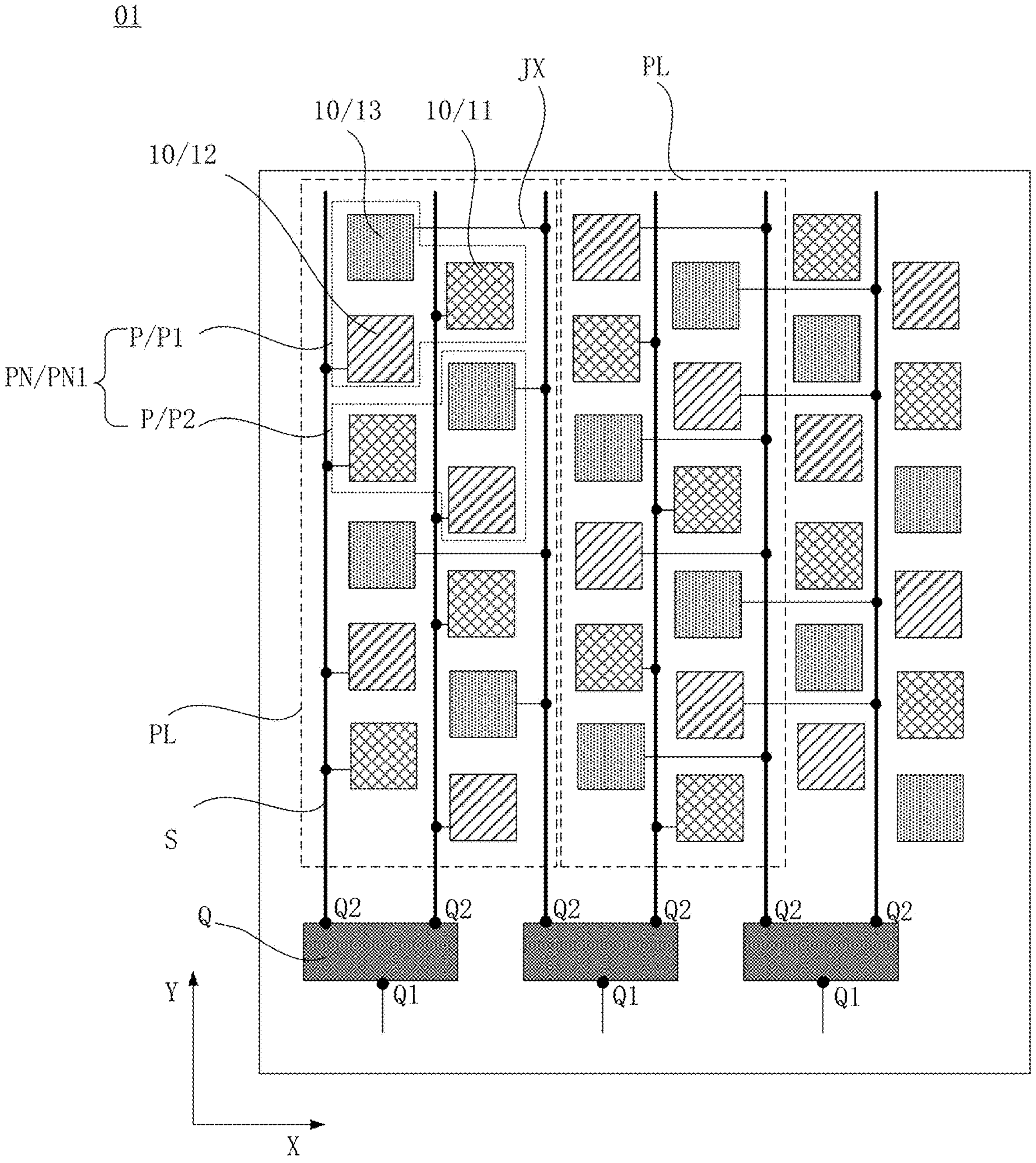
FIG. 7 is a schematic diagram of still another display panel provided by an embodiment of the present application.

FIG. 7 is a schematic diagram of still another display panel provided by an embodiment of the present application.

In one embodiment of the present application, as shown in FIG. 7, in the same pixel unit P, two sub-pixels of the first-color sub-pixel 11, the second-color sub-pixel 12, and the third-color sub-pixel 13 are arranged along the second direction Y, and the other sub-pixel of the first-color sub-pixel 11, the second-color sub-pixel 12, and the third-color sub-pixel 13 is arranged along the first direction X with the two sub-pixels and overlap with the two sub-pixels along the first direction X. That is, the first-color sub-pixel 11, the second-color sub-pixel 12, and the third-color sub-pixel 13 in the same pixel unit P can be arranged in a triangular pattern.

Two pixel units P adjacent to each other along the second direction Y form a pixel unit group PN, and the two pixel units P forming the pixel unit group PN can be a first pixel unit P1 and a second pixel unit P2, respectively.

In the same pixel unit group PN, the arrangement structure of the first-color sub-pixel 11, the second-color sub-pixel 12, and the third-color sub-pixel 13 in the first pixel unit P1, after being flipped 180° along the first direction X, is the same as the arrangement structure of the first-color sub-pixel 11, the second-color sub-pixel 12, and the third-color sub-pixel 13 in the second pixel unit P2.

In the embodiment of the present application, the sub-pixels 10 in the same pixel unit P are provided to be arranged in a triangular pattern, such that a distance between the sub-pixels 10 in the pixel unit P to be relatively small, which is conducive to improving the light mixing effect between the sub-pixels 10, thereby being conducive to enhancing the display quality of the display panel 01. Meanwhile, by setting that the arrangement structure of the first-color sub-pixel 11, the second-color sub-pixel 12, and the third-color sub-pixel 13 in the first pixel unit P1, after being flipped 180° along the first direction X, is the same as the arrangement structure of the first-color sub-pixel 11, the second-color sub-pixel 12, and the third-color sub-pixel 13 in the second pixel unit P2, it is conducive to ensuring a tight arrangement of the pixel units P, so as to guarantee the finesse of a displayed picture, and thus be conducive to further ensuring the display effect of the display panel 01.

Optionally, with continued reference to FIG. 7, in the same pixel unit group PN, the colors of the sub-pixels 10 arranged along the second direction Y are different. In this way, it is conducive to resulting in a more uniform distribution of the sub-pixels with different colors in the pixel unit group PN, and thus further improving the light mixing effect between the sub-pixels 10 and enhancing the display quality of the display panel 01.

Figure 8:
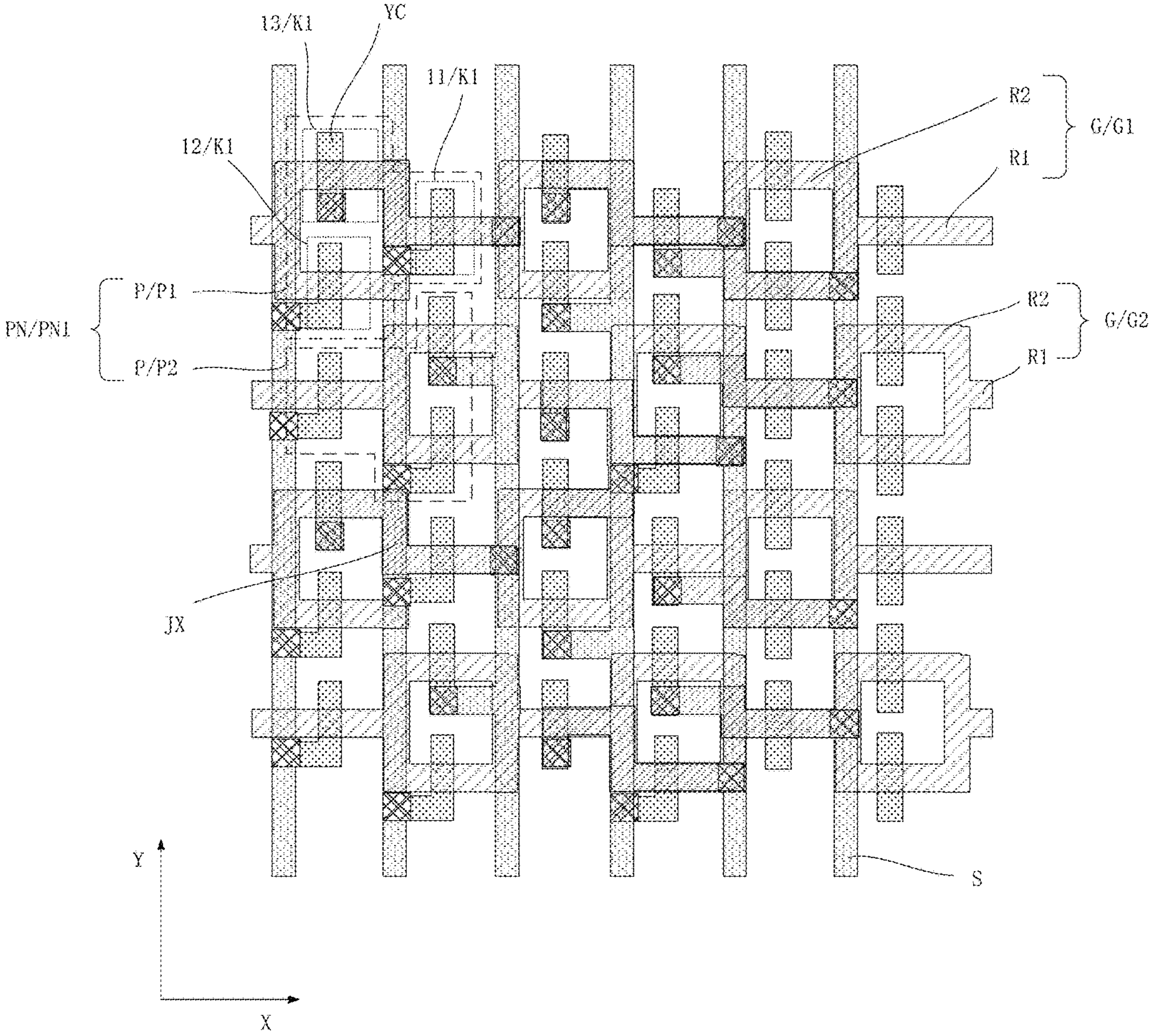
FIG. 8 is a schematic diagram of a planar layout of the display panel shown in FIG. 7.

FIG. 8 is a schematic diagram of a planar layout of the display panel shown in FIG. 7.

As shown in conjunction with FIG. 7 and FIG. 8, in one embodiment of the present application, the plurality of scan lines G are arranged along the second direction Y, and the plurality of scan lines G comprise a first scan line G1 and a second scan line G2 that are adjacent to each other along the second direction Y.

Wherein in at least some of the pixel unit groups PN arranged along the first direction X, the first pixel unit P1 is electrically connected to the first scan line G1, and the second pixel unit P2 is electrically connected to the second scan line G2. Of course, in the pixel unit groups PN arranged along the first direction X, the first pixel units P1 are arranged along the first direction X, and the second pixel units P2 are arranged along the first direction X.

In the embodiment of the present application, when the first scan line G1 transmits a valid signal to control the transistors T in the first pixel unit P1 to turn on and the output terminals Q2 of the demultiplexers Q transmit data signals to the data lines S electrically connected to the transistors T in the first pixel unit P1, the normal operation of the first pixel unit P1 is realized. When the second scan line G2 transmits a valid signal to control the transistors T in the second pixel unit P2 to turn on and the output terminals Q2 of the demultiplexers Q transmit data signals to the data lines S electrically connected to the transistors T in the second pixel unit P2, the normal operation of the second pixel unit P2 is realized. Of course, the data lines S connected to the first pixel unit P1 and the second pixel unit P2 can be the same.

In one embodiment of the present application, continuing in conjunction with FIG. 7 and FIG. 8, the same scan line G comprises a plurality of first portions R1 and winding portions R2 which are electrically connected, the first portions R1 extend along the first direction X, and the winding portions R2 and the first portions R1 are alternately arranged along the first direction X. The sub-pixel 10 comprises a switch module K1, which comprises an active layer YC, which can be an active layer of the transistor T comprised in the switch module K1 in the embodiment described above.

In the first-color sub-pixel 11, the second-color sub-pixel 12, and the third-color sub-pixel 13 of the same pixel unit P, the active layers YC of the two sub-pixels arranged along the second direction Y overlap with the winding portions R2 of the scan line G along the thickness direction of the display panel 01, and the active layer YC of the other sub-pixel overlaps with the first portion R1 of the scan line G along the thickness direction of the display panel 01.

For example, in the same pixel unit P, the first-color sub-pixel 11 and the second-color sub-pixel 12 are arranged along the second direction Y, the active layers YC of the switch modules K1 in both the first-color sub-pixel 11 and the second-color sub-pixel 12 overlap with the winding portions R2 of the scan line G along the thickness direction of the display panel 01; and the third-color sub-pixel 13 is arranged along the first direction X with the first-color sub-pixel 11 and the second-color sub-pixel 12 and overlaps with both the first-color sub-pixel 11 and the second-color sub-pixel 12 along the first direction X, and the active layer YC of the switch module K1 in the third-color sub-pixel 13 overlaps with the first portion R1 of the scan line G along the thickness direction of the display panel 01.

In other words, in the same pixel unit P, the sub-pixels 10 arranged along the second direction Y can be provided with a scan signal by the winding portion R2 of the scan line G, while the other sub-pixel 10 can be provided with the scan signal by the first portion R1 of the scan line G.

In the embodiment of the present application, while achieving the function of transmitting the scan signal from the scan line G to the sub-pixels 10, the structure of the scan line G can be relatively simple, which is conducive to reducing the difficulty and cost of the preparation of the scan line G.

Figure 9:
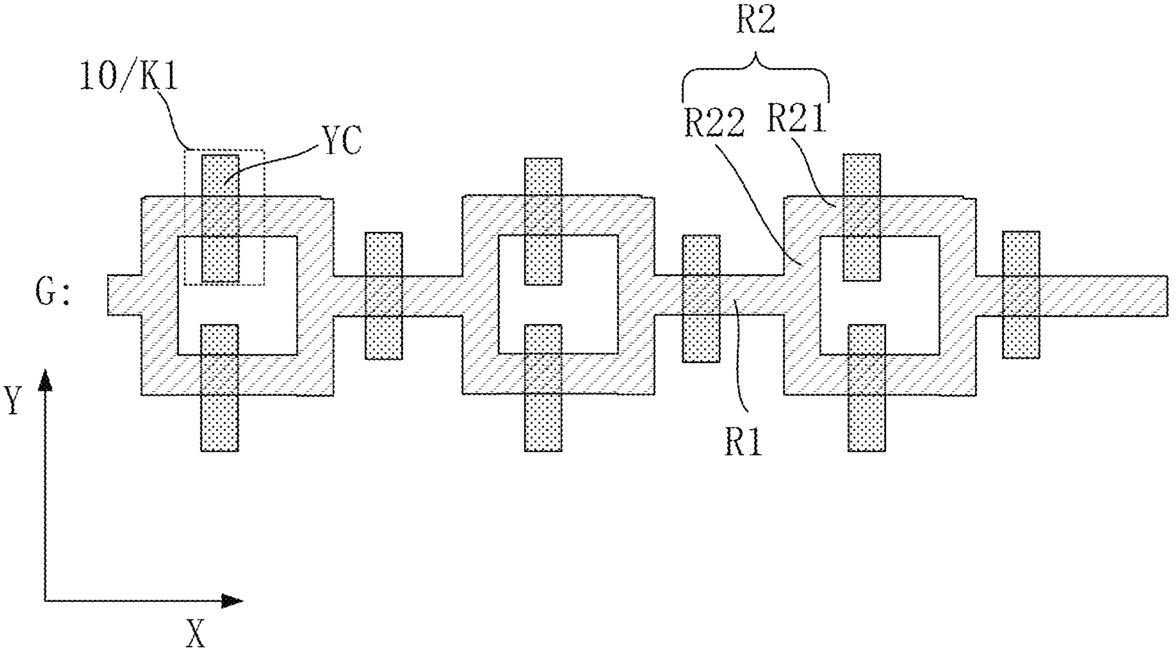
FIG. 9 is a schematic diagram of a positional relationship between a scan line and active layers in FIG. 8.

FIG. 9 is a schematic diagram of a positional relationship between a scan line and active layers in FIG. 8.

Optionally, as shown in FIG. 9, the same winding portion R2 comprises a first winding R21 extending along the first direction X and a second winding R22 extending along the second direction Y, and the first winding R21 is electrically connected to the second winding R22. The winding portion R2 can have a rectangular shape.

Wherein the first winding R21 overlaps with the active layer YC in the sub-pixel 10 along the thickness direction of the display panel 01, and the second winding R22 is electrically connected to an adjacent first portion R1 of the scan line.

In this way, in the same pixel unit P, the sub-pixels 10 arranged along the second direction Y can be provided a scan signal by the first windings R21, and the second winding R22 is configured to connect the first winding R21 and the first portion R1.

Figure 10:
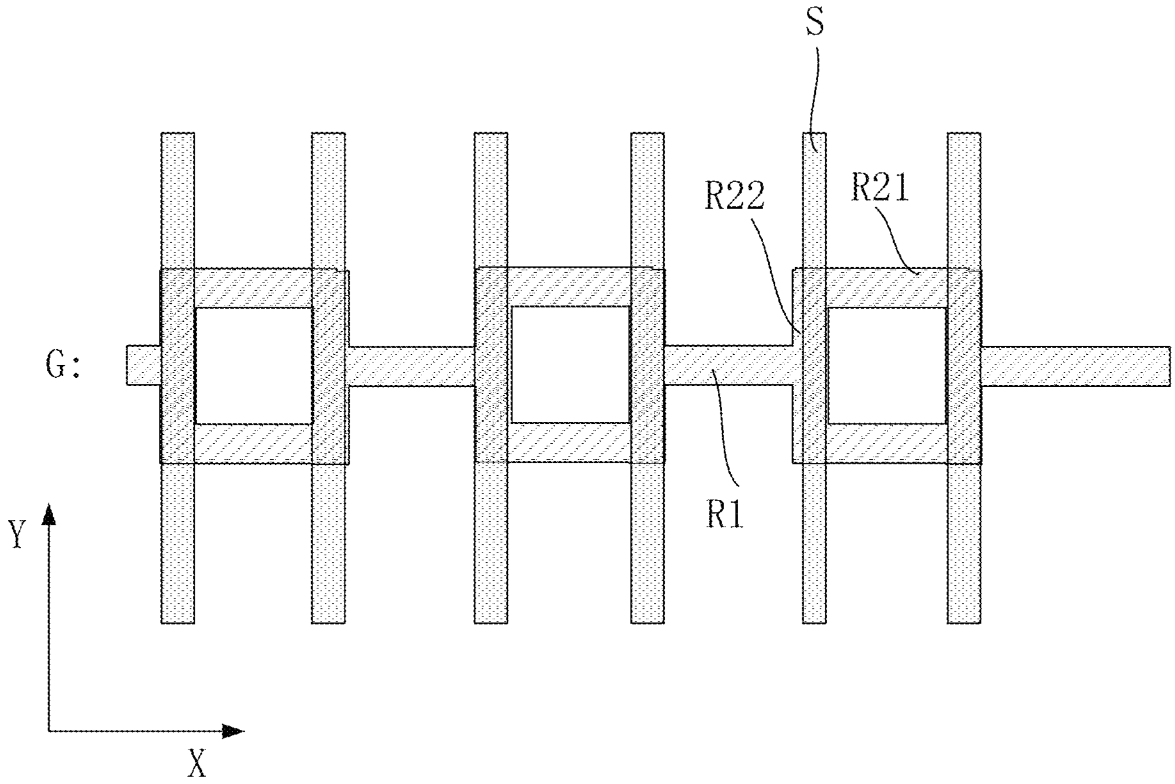
FIG. 10 is a schematic diagram of a positional relationship between a scan line and data lines in FIG. 8.

FIG. 10 is a schematic diagram of a positional relationship between a scan line and data lines in FIG. 8.

In one embodiment of the present application, as shown in FIG. 10, along the thickness direction of the display panel 01, the second winding R22 at least partially overlaps with the data line S.

Since both the data line S and the second winding R22 extend along the second direction Y, by setting the data line S and the second winding R22 to overlap at least partially along the thickness direction of the display panel 01, it is possible to reduce the space occupied by the data line S and the second winding R22 as a whole along the first direction X of the display panel 01, thereby being conducive to increasing the aperture ratio of the sub-pixel (i.e., the proportion of a transparent area of the sub-pixel) in the display panel 01.

Figure 11:
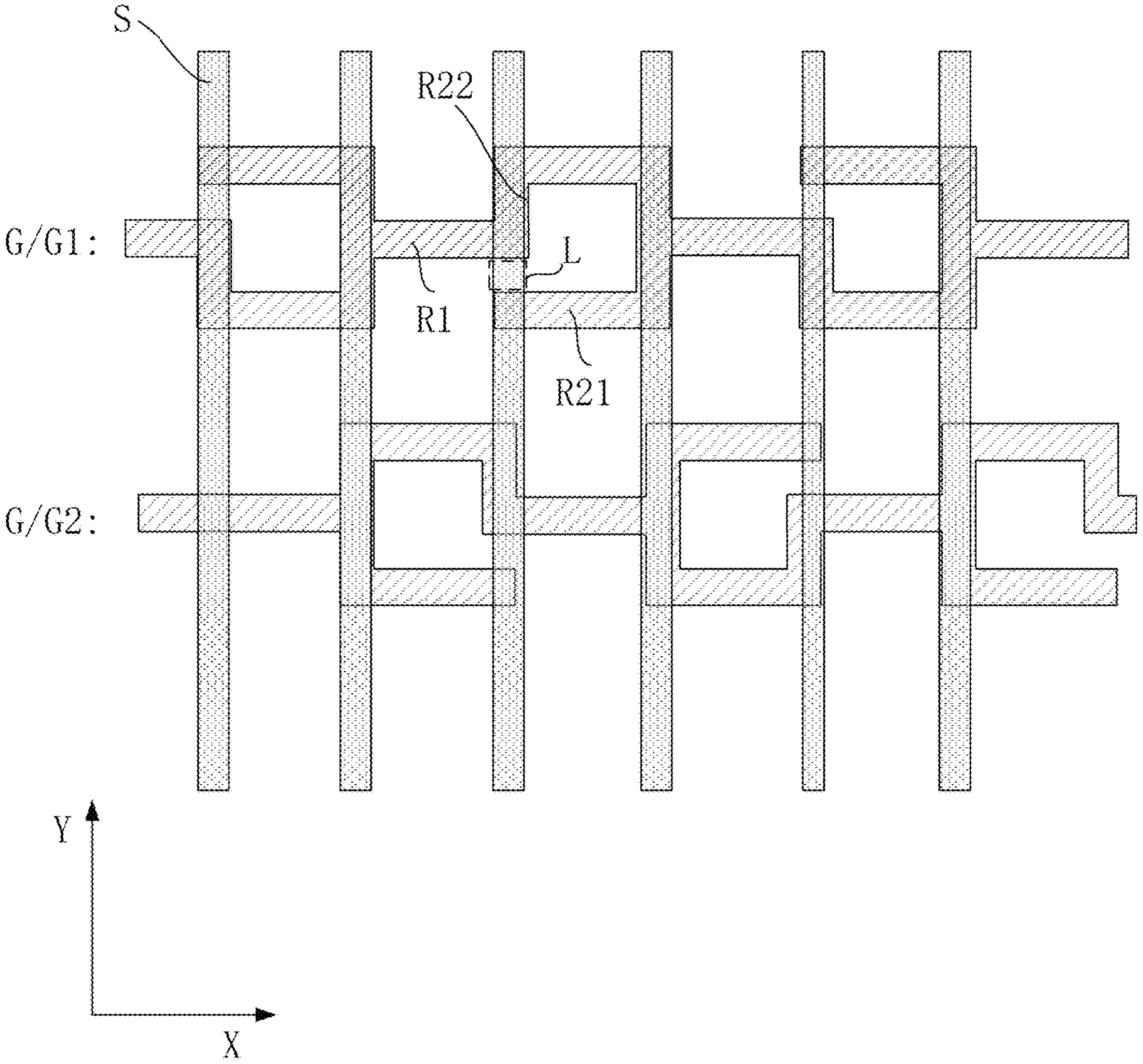
FIG. 11 is a schematic diagram of a positional relationship between scan lines and data lines related to the present application.

FIG. 11 is a schematic diagram of a positional relationship between scan lines and data lines related to the present application.

In one embodiment of the present application, as shown in FIG. 11, the winding portion R2 comprises a plurality of first windings R21 and second windings R22, in a same winding portion R2, an opening L is formed between some of the second windings R22 and the first winding R21, and along the thickness direction of the display panel 01, the opening L at least partially overlaps with the data line S.

In the embodiment of the present application, by setting the opening L between some of the second windings R22 and the first winding R21 and making the opening L to overlap at least partially with the data line S, it is conducive to reducing parasitic capacitance between the second winding R22 and the data line S while ensuring the effect of connecting the second winding R22 with the first winding R21 and the first portion R1.

Optionally, as shown in conjunction with FIG. 8 and FIG. 11, for the first scan line G1 electrically connected to the same pixel unit group PN and the second scan line G2 electrically connected to the same pixel unit group PN, the first scan line G1, after being flipped 180° along the first direction X and being flipped 180° along the second direction Y, has the same structure as the second scan line G2.

Figure 12:
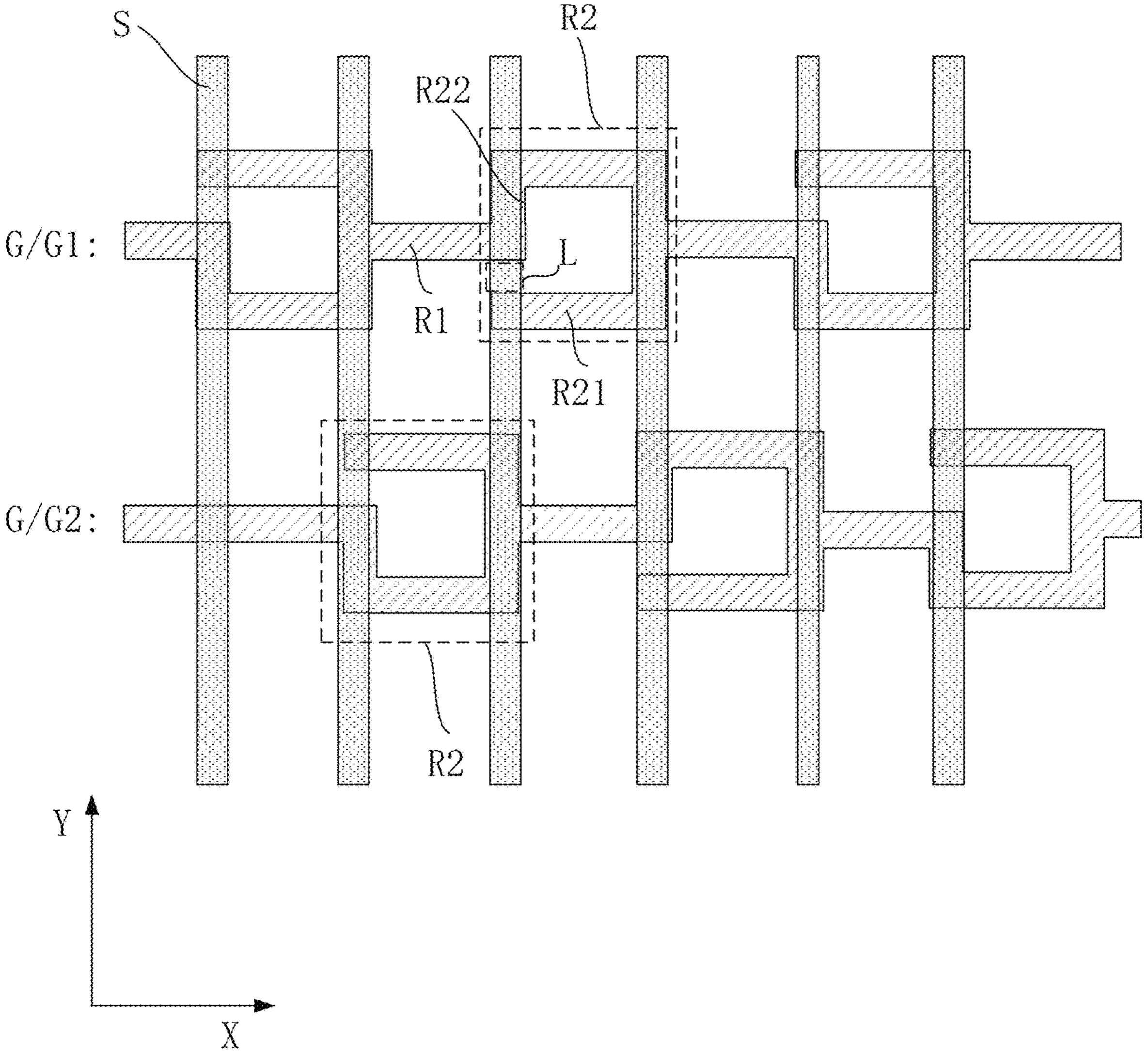
FIG. 12 is a schematic diagram of another positional relationship between scan lines and data lines related to the present application.

FIG. 12 is a schematic diagram of another positional relationship between scan lines and data lines related to the present application.

In another embodiment of the present application, as shown in FIG. 12, along the thickness direction of the display panel 01, in a plurality of winding portions R2 overlapping with the same data line S, the openings L in some of the winding portions R2 overlap with the data line S, while the openings L in some of the winding portions R2 do not overlap with the data line S.

For example, along the thickness direction of the display panel 01, the same data line S overlaps with both the winding portion R2 of the first scan line G1 and the winding portion R2 of the second scan line G2, wherein the opening L in the winding portion R2 of the first scan line G1 overlaps with the data line S, while the opening L in the winding portion R2 of the second scan line G2 does not overlap with the data line S. Of course, the opening L in the winding portion R2 of the second scan line G2 can overlap with a data line adjacent to the data line S.

In the embodiment of the present application, it is possible to make each data line S overlap with the opening L in the winding portion R2, thereby being conducive to making the parasitic capacitance between each data line S and the winding portion R2 be the same, so that the distribution of the parasitic capacitances between the data lines S and the winding portions R2 in the display panel 01 are more uniform, which in turn is conducive to ensuring the brightness uniformity of the display panel 01.

In one embodiment of the present application, as shown in FIG. 5 and FIG. 7, in the same pixel unit group PN, the sub-pixels 10 arranged along the second direction Y and located in different pixel units P are electrically connected to the same data line S, while remaining sub-pixels 10 which are located in the different pixel units P are electrically connected to another same data line S.

For example, as shown in FIG. 5, in the first pixel unit group PN1, the first-color sub-pixel 11 and the third-color sub-pixel 13 in the first pixel unit P1 and the second-color sub-pixel 12 in the second pixel unit P2 are arranged along the second direction Y; and the second-color sub-pixel 12 in the first pixel unit P1 and the first-color sub-pixel 11 and the third-color sub-pixel 13 in the second pixel unit P2 are arranged along the second direction Y.

Wherein the first-color sub-pixel 11 in the first pixel unit P1 and the second-color sub-pixel 12 in the second pixel unit P2 are electrically connected to the same data line S; the second-color sub-pixel 12 in the first pixel unit P1 and the first-color sub-pixel 11 in the second pixel unit P2 are electrically connected to the same data line S; and the third-color sub-pixel 13 in the first pixel unit P1 and the third-color sub-pixel 13 in the second pixel unit P2 are electrically connected to the same data line S.

For the connection manner between the data line S and the sub-pixels 10, the data line S can be electrically connected to the sub-pixels 10 in one column adjacent thereto, the data line S can also be electrically connected to the sub-pixels 10 in two columns adjacent thereto, and the data line S can further be electrically connected to the sub-pixels 10 in columns non-adjacent thereto.

As shown in FIG. 6 and FIG. 8, when the sub-pixel 10 is not adjacent to the data line S electrically connected thereto in the first direction X, i.e., when there are other data lines between the sub-pixel 10 and the data line S electrically connected thereto, the sub-pixel 10 is electrically connected to the data line S via a bridging line JX. In this way, it is possible to prevent short circuits between different data lines S.

Optionally, the bridging line JX is located on a side of the data line S close to a light emission surface of the display panel 01.

Figure 13:
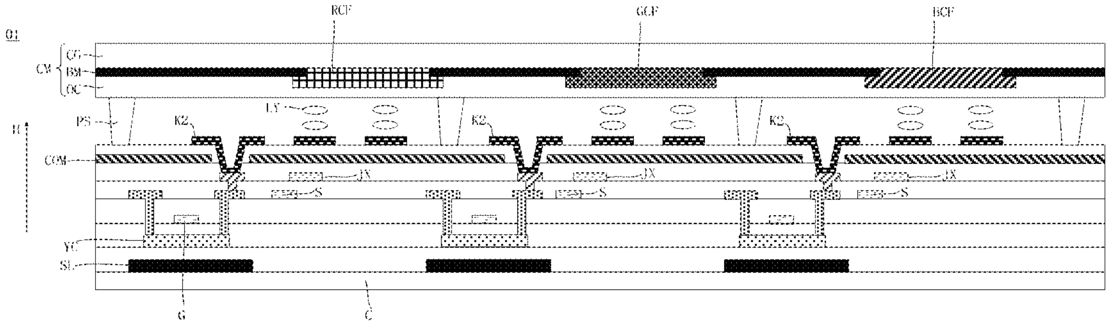
FIG. 13 is a schematic diagram of a partial structure of a display panel provided by an embodiment of the present application.

FIG. 13 is a schematic diagram of a partial structure of a display panel provided by an embodiment of the present application.

Specifically, as shown in FIG. 13, the display panel 01 comprises a substrate C (such as a glass substrate), as well as a light-shielding layer SL, scan lines G (each serving as a gate of a transistor at a position where it overlaps with an active layer of the transistor), data lines S, and pixel electrodes K2 that are located at one side of the substrate C, the data lines S are located on a side of the scan lines G away from the substrate C, the pixel electrodes K2 are located on a side of the data lines S away from the substrate C, and the bridging line JX are located between a film layer where the data lines are located and a film layer where the pixel electrodes K2 are located.

Further, as shown in FIG. 13, the display panel 01 may be a liquid crystal display panel, the display panel 01 further comprises common electrodes COM, a color film base plate CM, as well as liquid crystal layers LY and support pillars PS sandwiched between the substrate C and the color film base plate CM, the color film base plate CM may comprise a top substrate CG, a black matrix BM, a red color filter RCF, a green color filter GCF, a blue color filter BCF, and an overcoat layer OC.

In one embodiment of the present application, with continued reference to FIG. 13, FIG. 6, and FIG. 8, along the thickness direction H of the display panel 01, at least a portion of the bridging line JX overlaps with the scan line G.

Where the display panel 01 is a liquid crystal display panel, light-emitting devices are provided on a backlight module, and in the embodiment of the present application, by setting at least a portion of the bridging line JX to overlap with the scan line G, it is possible to reduce the obstruction of the light emitted from the backlight module by the bridging line JX and the scan line G as a whole, which is conducive to ensuring the transmittance of the liquid crystal display panel and improving the aperture ratio of the sub-pixels.

With continued reference to FIG. 7, in one embodiment of the present application, at least some of the pixel units P arranged along the second direction Y form a pixel unit column PL, in a same pixel unit column PL, the first-color sub-pixels 11 and the second-color sub-pixels 12 arranged along the second direction Y are electrically connected to the same data line S, and the third-color sub-pixels 13 in the same pixel unit column PL are electrically connected to another same data line S. Alternatively, in a same pixel unit column PL, the second-color sub-pixels 12 and the third-color sub-pixels 13 arranged along the second direction Y are electrically connected to the same data line S, and the first-color sub-pixels 11 in the same pixel unit column PL are electrically connected to another same data line S.

In the embodiment of the present application, in at least some of the pixel unit columns PL, it may be provided that the first-color sub-pixels 11 and the second-color sub-pixels 12 arranged along the second direction Y are electrically connected to the same data line S, while the remaining third-color sub-pixels 13 are electrically connected to another same data line S; in at least some of the other pixel unit columns PL, it may be provided that the second-color sub-pixels 12 and the third-color sub-pixels 13 arranged along the second direction Y are electrically connected to the same data line S, while the remaining first-color sub-pixels 11 are electrically connected to another same data line S. Thereby, it is conducive to the flexible connection between the data lines S and the sub-pixels 10 based on the positional relationship between the pixel unit columns PL and the data lines S, so as to allow for reducing the connection line length between the pixel unit columns PL and the data lines S as much as possible while increasing the structural diversity of the display panel.

Figure 14:
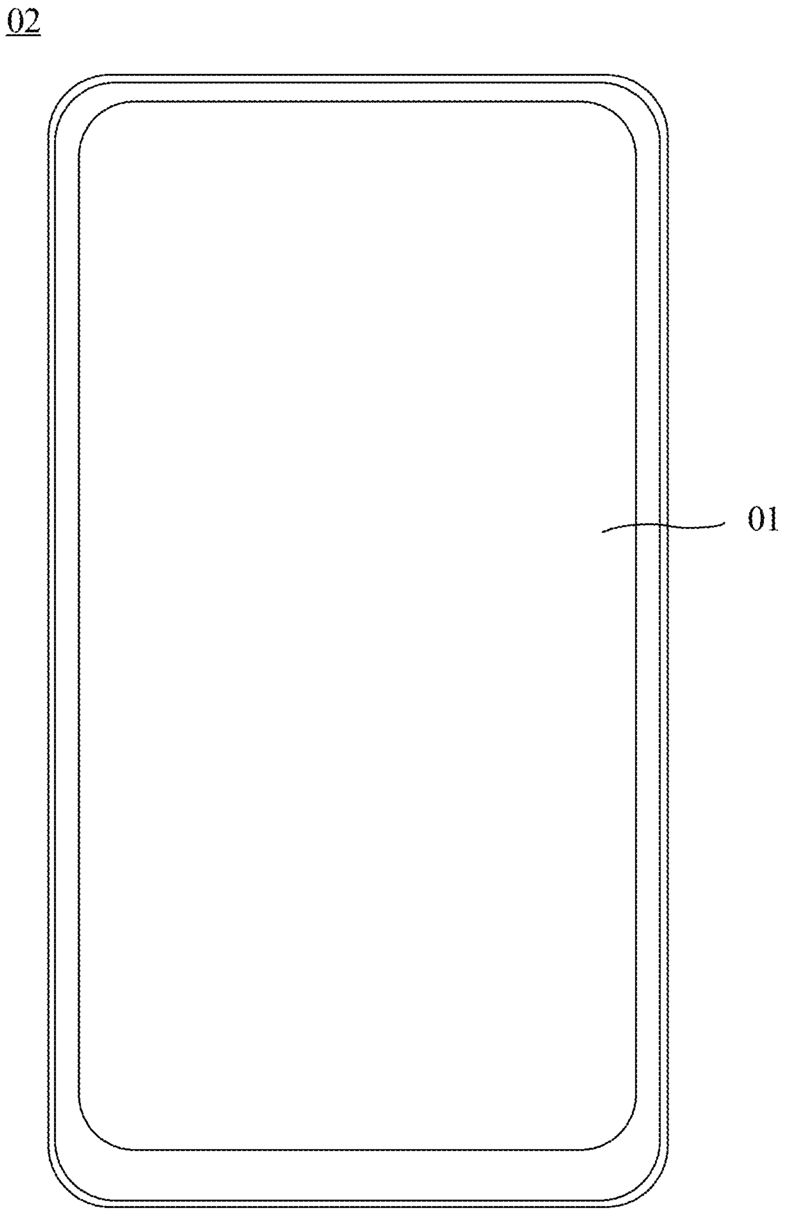
FIG. 14 is a schematic diagram of a display apparatus provided by an embodiment of the present application.

FIG. 14 is a schematic diagram of a display apparatus provided by an embodiment of the present application.

An embodiment of the present application provides a display apparatus 02, as shown in FIG. 14, the display apparatus 02 comprises the display panel 01 provided by the foregoing embodiments. Exemplarily, the display device 02 provided by the embodiments of the present application can be a mobile phone, a computer, a television, an in-vehicle display, or other electronic devices, without specific limitation by the present application.

In the display apparatus 02, by setting each pixel unit P to comprise at least three sub-pixels 10 with different colors, the pixel units P need not to borrow sub-pixels 10 from each other while achieving full-color display of the display panel 01, which is conducive to reducing the difficulty of driving the display panel 01, thereby being conducive to reduce the chances of problems in driving the pixel units P to operate, and in turn being conducive to improving the stability of display quality.

Furthermore, by providing 1:2 demultiplexers Q to transmit data signals to sub-pixels 10, it is possible not only to reduce the number of ports through which a driving chip provides the data signals to the display panel 01 to a certain extent, but also ensure that each sub-pixel 10 has sufficient charging time, which is especially conducive to ensuring that each sub-pixel 10 has sufficient charging time during high frequency display of the display panel 01 with high pixel density, thereby being conducive to ensuring that each sub-pixel 10 receives a data signal that meets the requirements, and in turn being conducive to ensuring the display quality of the display panel 01.

The above descriptions are merely preferred embodiments of the present application and are not intended to limit the present application. Any modification, equivalent replacement and improvement within the spirit and principle of the present application shall be comprised within the protection scope of the present application.

What is claimed is:

1. A display panel, comprising:

a plurality of pixel units;

a plurality of scan lines, and a plurality of data lines, wherein the plurality of pixel units each comprise a plurality of sub-pixels, the plurality of sub-pixels in a same pixel unit are electrically connected to a same scan line, and the plurality of sub-pixels in the same pixel unit are each electrically connected to different data lines;

demultiplexers, wherein each of the demultiplexers comprises two output terminals electrically connected to the different data lines, and is configured to transmit data signals to the different data lines; and wherein the plurality of sub-pixels of the same pixel unit comprise at least three sub-pixels with different colors;

wherein the plurality of data lines are arranged along a first direction and extend along a second direction, and the first direction intersects with the second direction; and the at least three sub-pixels with different colors in each of the plurality of pixel units comprise a first-color sub-pixel, a second-color sub-pixel, and a third-color sub-pixel, and in the same pixel unit, the plurality of data lines electrically connected to the first-color sub-pixel, the second-color sub-pixel, and the third-color sub-pixel are adjacent to each other in the first direction; and wherein two sub-pixels of the first-color sub-pixel, the second-color sub-pixel, and the third-color sub-pixel in the same pixel unit are arranged along the first direction, and another sub-pixel of the first-color sub-pixel, the second-color sub-pixel, and the third-color sub-pixel is arranged along the second direction with one of the two sub-pixels and overlaps with the one of the two sub-pixels along the second direction, forming an arrangement of an "L" shape, and two adjacent pixel units along the second direction form a pixel unit group, and in a same pixel unit group, the first-color sub-pixels, the second-color sub-pixels, and the third-color sub-pixels form a rectangular arrangement;

wherein the plurality of scan lines are arranged along the second direction, and the plurality of scan lines comprise a first scan line and a second scan line that are adjacent to each other along the second direction; and two pixel units in a same pixel unit group are a first pixel unit and a second pixel unit, and in at least two of pixel unit groups arranged along the first direction, the first pixel unit is electrically connected to the first scan line, and the second pixel unit is electrically connected to the second scan line, and wherein the plurality of scan lines each comprise a main portion extending along the first direction and a plurality of branches connected to the main portion; the plurality of sub-pixels each comprise a switch module, and the switch module comprises an active layer; and wherein in at least two of the plurality of sub-pixels arranged along the first direction, the active layers overlap with a main portion of the same scan line along a thickness direction of the display panel; and in the first-color sub-pixel, the second-color sub-pixel, and the third-color sub-pixel of the same pixel unit, the active layer in one sub-pixel which is not arranged along the first direction with other two sub-pixels overlaps with the branch of the scan line along the thickness direction of the display panel.

2. The display panel according to claim 1, wherein in the same pixel unit group, the plurality of sub-pixels arranged along the second direction are different from each other in color; and wherein in two adjacent pixel unit groups along the first direction, the plurality of sub-pixels of one of the two adjacent pixel unit groups and the plurality of sub-pixels of another one of two adjacent pixel unit groups that are adjacent to each other along the first direction are different from each other in color.

3. The display panel according to claim 1, wherein branches of the first scan line are located on a side of the main portion thereof that faces the second scan line, branches of the second scan line are located on a side of the main portion thereof that faces the first scan line, and along the first direction, the branches of the first scan line are arranged alternately with the branches of the second scan line.

4. The display panel according to claim 1, wherein in the same pixel unit group, sub-pixels arranged along the second direction and located in different pixel units are electrically connected to a same data line, while remaining sub-pixels located in the different pixel units are electrically connected to another same data line.

5. The display panel according to claim 4, wherein when a sub-pixel is not adjacent to the data line electrically connected thereto in the first direction, the sub-pixel is electrically connected to the data line via a bridging line.

6. The display panel according to claim 5, wherein the bridging line is located on a side of the data line close to a light emission surface of the display panel.

7. The display panel according to claim 5, wherein along the thickness direction of the display panel, at least a portion of the bridging line overlaps with a scan line.

8. The display panel according to claim 4, wherein at least some of pixel units arranged along the second direction form a pixel unit column, in a same pixel unit column, the first-color sub-pixels and the second-color sub-pixels arranged along the second direction are electrically connected to the same data line, and the third-color sub-pixels in the same pixel unit column are electrically connected to another same data line; or in a same pixel unit column, the second-color sub-pixels and the third-color sub-pixels arranged along the second direction are electrically connected to the same data line, and the first-color sub-pixels in the same pixel unit column are electrically connected to another same data line.

9. A display panel, comprising:

a plurality of pixel units;

a plurality of scan lines, and a plurality of data lines, wherein the plurality of pixel units each comprise a plurality of sub-pixels, the plurality of sub-pixels in a same pixel unit are electrically connected to a same scan line, and the plurality of sub-pixels in the same pixel unit are each electrically connected to different data lines;

demultiplexers, wherein each of the demultiplexers comprises two output terminals electrically connected to the different data lines, and is configured to transmit data signals to the different data lines; and wherein the plurality of sub-pixels of the same pixel unit comprise at least three sub-pixels with different colors;

wherein the plurality of data lines are arranged along a first direction and extend along a second direction, and the first direction intersects with the second direction; and the at least three sub-pixels with different colors in each of the plurality of pixel units comprise a first-color sub-pixel, a second-color sub-pixel, and a third-color sub-pixel, and in the same pixel unit, the plurality of data lines electrically connected to the first-color sub-pixel, the second-color sub-pixel, and the third-color sub-pixel are adjacent to each other in the first direction; and wherein two sub-pixels of the first-color sub-pixel, the second-color sub-pixel, and the third-color sub-pixel in the same pixel unit are arranged along the second direction, and another sub-pixel of the first-color sub-pixel, the second-color sub-pixel, and the third-color sub-pixel is arranged along the first direction with the two sub-pixels and overlap with the two sub-pixels along the first direction;

wherein two adjacent pixel units along the second direction form a pixel unit group, and the two pixel units forming the pixel unit group are a first pixel unit and a second pixel unit; and in a same pixel unit group, an arrangement structure of the first-color sub-pixel, the second-color sub-pixel, and the third-color sub-pixel in the first pixel unit, after being flipped 180° along the first direction, is identical to an arrangement structure of the first-color sub-pixel, the second-color sub-pixel, and the third-color sub-pixel in the second pixel unit, wherein in the same pixel unit group, the plurality of sub-pixels arranged along the second direction are different from each other in color.

10. The display panel according to claim 9, wherein the plurality of scan lines are arranged along the second direction and comprise a first scan line and a second scan line that are adjacent to each other along the second direction; and in at least two of pixel unit groups arranged along the first direction, the first pixel unit is electrically connected to the first scan line, and the second pixel unit is electrically connected to the second scan line, and wherein a same scan line comprises a plurality of first portions and winding portions electrically connected, the first portions extend along the first direction, and the winding portions and the first portions are alternately arranged along the first direction; and the sub-pixels each comprise a switch module, and the switch module comprises an active layer; and in the first-color sub-pixel, the second-color sub-pixel, and the third-color sub-pixel of the same pixel unit, the active layers in two sub-pixels arranged along the second direction overlap with the winding portion of a scan line along the thickness direction of the display panel, and the active layer in another sub-pixel overlaps with the first portion of the scan line along the thickness direction of the display panel.

11. The display panel according to claim 10, wherein a same winding portion comprises a first winding extending along the first direction and a second winding extending along the second direction, and the first winding is electrically connected to the second winding;

wherein the first winding overlaps with the active layer in the sub-pixel along the thickness direction of the display panel, and the second winding is electrically connected to an adjacent first portion of the scan line.

12. The display panel according to claim 11, wherein along the thickness direction of the display panel, the second winding at least partially overlaps with a data line.

13. The display panel according to claim 12, wherein the winding portion comprises a plurality of first windings and second windings, in a same winding portion, an opening is formed between some of the second windings and the first winding, and along the thickness direction of the display panel, the opening at least partially overlaps with the data line.

14. The display panel according to claim 13, wherein along the thickness direction of the display panel, in a plurality of winding portions overlapping with a same data line, the openings in some of the plurality of winding portions overlap with the same data line, while the openings in some of the plurality of winding portions do not overlap with the same data line.

15. The display panel according to claim 13, wherein the first scan line, after being flipped 180° along the first direction and being flipped 180° along the second direction, has a same structure as the second scan line.

16. A display apparatus, comprising a display panel, wherein the display panel comprises a plurality of pixel units, a plurality of scan lines, and a plurality of data lines, wherein the plurality of pixel units each comprise a plurality of sub-pixels, the plurality of sub-pixels in a same pixel unit are electrically connected to a same scan line, and the plurality of sub-pixels in the same pixel unit are each electrically connected to different data lines;

demultiplexers, each of the demultiplexers comprises two output terminals electrically connected to the different data lines, and is configured to transmit data signals to the different data lines;

wherein the plurality of sub-pixels of the same pixel unit comprise at least three sub-pixels with different colors;

wherein the plurality of data lines are arranged along a first direction and extend along a second direction, and the first direction intersects with the second direction; and the at least three sub-pixels with different colors in each of the plurality of pixel units comprise a first-color sub-pixel, a second-color sub-pixel, and a third-color sub-pixel, and in the same pixel unit, the plurality of data lines electrically connected to the first-color sub-pixel, the second-color sub-pixel, and the third-color sub-pixel are adjacent to each other in the first direction; and wherein two sub-pixels of the first-color sub-pixel, the second-color sub-pixel, and the third-color sub-pixel in the same pixel unit are arranged along the first direction, and another sub-pixel of the first-color sub-pixel, the second-color sub-pixel, and the third-color sub-pixel is arranged along the second direction with one of the two sub-pixels and overlaps with the one of the two sub-pixels along the second direction, forming an arrangement of an "L" shape, and two adjacent pixel units along the second direction form a pixel unit group, and in a same pixel unit group, the first-color sub-pixels, the second-color sub-pixels, and the third-color sub-pixels form a rectangular arrangement;

wherein the plurality of scan lines are arranged along the second direction, and the plurality of scan lines comprise a first scan line and a second scan line that are adjacent to each other along the second direction; and two pixel units in a same pixel unit group are a first pixel unit and a second pixel unit, and in at least two of pixel unit groups arranged along the first direction, the first pixel unit is electrically connected to the first scan line, and the second pixel unit is electrically connected to the second scan line, and wherein the plurality of scan lines each comprise a main portion extending along the first direction and a plurality of branches connected to the main portion; the plurality of sub-pixels each comprise a switch module, and the switch module comprises an active layer; and wherein in at least two of the plurality of sub-pixels arranged along the first direction, the active layers overlap with a main portion of the same scan line along a thickness direction of the display panel; and in the first-color sub-pixel, the second-color sub-pixel, and the third-color sub-pixel of the same pixel unit, the active layer in one sub-pixel which is not arranged along the first direction with other two sub-pixels overlaps with the branch of the scan line along the thickness direction of the display panel.

* * * * *